United States Patent
Osuka et al.

(10) Patent No.: US 8,356,049 B2
(45) Date of Patent: Jan. 15, 2013

(54) LANDMARK SEARCH APPARATUS, ELECTRONIC APPARATUS AND IMAGING APPARATUS HAVING THE SAME, AND LANDMARK SEARCH METHOD

(75) Inventors: Kyosuke Osuka, Osaka (JP); Takehiro Hattori, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/033,762

(22) Filed: Feb. 24, 2011

(65) Prior Publication Data

US 2011/0213798 A1  Sep. 1, 2011

(30) Foreign Application Priority Data

Feb. 26, 2010  (JP) .................... 2010-041508

(51) Int. Cl.
*G06F 17/30* (2006.01)
(52) U.S. Cl. ..................... 707/769
(58) Field of Classification Search .............. 707/769, 707/919
See application file for complete search history.

(56) References Cited

U.S. PATENT DOCUMENTS

| | | | |
|---|---|---|---|
| 2002/0072848 A1 | 6/2002 | Hamada et al. | |
| 2004/0030832 A1* | 2/2004 | Squibbs | 711/118 |
| 2004/0093466 A1* | 5/2004 | Hull | 711/133 |
| 2004/0132467 A1* | 7/2004 | Hull et al. | 455/458 |
| 2007/0110316 A1* | 5/2007 | Ohashi | 382/195 |
| 2007/0219708 A1* | 9/2007 | Brasche et al. | 701/207 |
| 2008/0221791 A1* | 9/2008 | Sukovic | 701/211 |
| 2009/0119009 A1* | 5/2009 | Dicke | 701/209 |

FOREIGN PATENT DOCUMENTS

| | | |
|---|---|---|
| JP | 2002-181563 | 6/2002 |
| JP | 2005-301196 | 10/2005 |
| JP | 2007-164534 | 6/2007 |
| JP | 2007-303878 | 11/2007 |

* cited by examiner

*Primary Examiner* — Apu Mofiz
*Assistant Examiner* — Dara J Glasser
(74) *Attorney, Agent, or Firm* — Panasonic Patent Center

(57) ABSTRACT

A landmark search apparatus includes a position obtaining unit configured to obtain a current position of the object, a first storage unit configured to store landmark information including a name of a landmark and position information of the landmark related to the name, an retrieving unit configured to retrieve the landmark information from the first storage unit based on the obtained current position, a second storage unit configured to store the retrieved landmark information as retrieved landmark information, and a determining unit configured to determine whether the retrieved landmark information is valid, based on the current position of the object, and a distance between a position of the subject at the time of storing the retrieved landmark information in the second storage unit and the landmark indicated by the retrieved landmark information.

18 Claims, 10 Drawing Sheets

Fig. 3

| ID | LANDMARK NAME | POSITION INFORMATION |
|---|---|---|
| 1 | "A" PARK | 0° 0' 0" E, 0° 0' 0" N |
| 2 | "B" TOWER | 0° 0' 0" E, 0° 0' 0" N |
| 3 | "C" HOTEL | 0° 0' 0" E, 0° 0' 0" N |
| 4 | "D" BRIDGE | 0° 0' 0" E, 0° 0' 0" N |
| 5 | "E" MUSEUM | 0° 0' 0" E, 0° 0' 0" N |
| 6 | "F" HALL | 0° 0' 0" E, 0° 0' 0" N |
| 7 | "G" CENTER | 0° 0' 0" E, 0° 0' 0" N |
| 8 | "H" SHOP | 0° 0' 0" E, 0° 0' 0" N |
| 9 | "I" SUPERMARKET | 0° 0' 0" E, 0° 0' 0" N |
| 10 | "J" MUSEUM | 0° 0' 0" E, 0° 0' 0" N |

(Nd=5, Nmax=9)

244

DISPLAYED | NOT DISPLAYED

| ID | LANDMARK NAME | DISTANCE FROM CURRENT POSITION | POSITION INFORMATION |
|---|---|---|---|
| 9 | "I" SUPERMARKET | 50m | 0° 0' 0" E, 0° 0' 0" N |
| 4 | "D" BRIDGE | 100m | 0° 0' 0" E, 0° 0' 0" N |
| 3 | "C" HOTEL | 200m | 0° 0' 0" E, 0° 0' 0" N |
| 5 | "E" MUSEUM | 200m | 0° 0' 0" E, 0° 0' 0" N |
| 1 | "A" PARK | 400m (Ld) | 0° 0' 0" E, 0° 0' 0" N |
| 6 | "F" HALL | 600m | 0° 0' 0" E, 0° 0' 0" N |
| 7 | "G" CENTER | 800m | 0° 0' 0" E, 0° 0' 0" N |
| 8 | "H" SHOP | 900m | 0° 0' 0" E, 0° 0' 0" N |
| 2 | "B" TOWER | 1000m (Lmax) | 0° 0' 0" E, 0° 0' 0" N |

US 8,356,049 B2

LANDMARK SEARCH APPARATUS, ELECTRONIC APPARATUS AND IMAGING APPARATUS HAVING THE SAME, AND LANDMARK SEARCH METHOD

BACKGROUND

1. Technical Field

The technical field relates to a landmark search apparatus for searching for landmark around an obtained current position, and an electronic apparatus and an imaging apparatus having the landmark search apparatus.

2. Related Art

Conventionally, there is a landmark search apparatus that obtains a current position of an electronic apparatus and searches for landmarks near the current position. In general, the landmark search apparatus performs search using an index function of database control. However, use of the index function requires a lot of memory regions for managing indexes. When a memory region is limited and sufficient memory region cannot be secured, a process for updating indexes is necessary every time a search range changes. Therefore, since it takes a time to execute a process for creating indexes, the time required for the search process becomes longer.

A method for solving this problem includes a method for caching results of searching a database for landmarks in a memory, and reading the results from the memory so as to display them as required (for example, see JP 2007-303878 A).

However, in such a conventional method, information about a sufficient number of landmarks should be cached in the memory in order to obtain results of searching for landmarks accurately at high speed, so that a large-capacity memory is required for cache.

SUMMARY

To solve the aforementioned problem, a landmark search apparatus is provided which is capable of executing a landmark searching process accurately at high speed using a small-capacity memory.

In a first aspect, a landmark search apparatus for retrieving landmarks around an object is provided. The landmark search apparatus includes a position obtaining unit configured to obtain a current position of the object, a first storage unit configured to store landmark information including a name of a landmark and position information of the landmark related to the name, a retrieving unit configured to retrieve the landmark information from the first storage unit based on the obtained current position, a second storage unit configured to store the retrieved landmark information as retrieved landmark information, and a determining unit configured to determine whether the retrieved landmark information is valid, based on the current position of the object, and distance between a position of the subject at the time of storing the retrieved landmark information in the second storage unit and the landmark indicated by the retrieved landmark information.

In a second aspect, an electronic apparatus is provided, which includes the above landmark search apparatus, and a display unit configured to display at least part of all pieces of the retrieved landmark information.

In a third aspect, an imaging apparatus is provided, which includes the above landmark search apparatus, an imaging unit configured to capture a subject image formed by an optical system to generate image data, and a recording unit configured to relate the image data with at least part of all pieces of retrieved landmark information and to record them in a recording medium.

In a fourth aspect, a landmark search method for searching for landmark around an object is provided. The method includes obtaining a current position of the object, storing a name of the landmark and position information of the landmark, as landmark information, in a first storage unit, with the name of the landmark related with the position information of the landmark, retrieving the landmark information from the first storage unit based on the obtained current position, storing the retrieved landmark information, as retrieved landmark information in a second storage unit, and determining whether the retrieved landmark information is valid, based on the current position of the object and a distance between a position of the object at the time the retrieved landmark information is stored in the second storage unit and the landmark represented by the retrieved landmark information.

According to the above aspects, validity of the landmark information stored (cached) in the second storage unit is determined. When the landmark information is valid, new landmark information is not searched, while when invalid, landmark information is re-searched. In such an arrangement, when cached landmark information is not valid, landmark information can be always re-searched so that valid information is always cached, thereby realizing accurate search of landmarks. Further, only when cached landmark information is invalid, landmark information is re-searched, so that the number of times of searching can be suppressed thereby resulting in a high speed of the landmark search process. In this manner, the landmark search apparatus can be provided for enabling landmark search process accurately and at high speed with a small-capacity memory.

BRIEF DESCRIPTION OF DRAWINGS

FIG. 3 is a diagram illustrating one example of a landmark database (DB) to be stored in the internal memory.

FIG. 5 is a diagram illustrating one example of cache of retrieved landmark information.

DETAILED DESCRIPTION OF PREFERRED EMBODIMENTS

Preferred embodiments are described below with reference to the accompanying drawings.

First Embodiment

1. Outline

A digital camera including a landmark search apparatus is described below as one embodiment. The digital camera stores plural sets of position information about landmarks as well as landmark names in a database. The digital camera retrieves a plurality of landmarks around a current position based on the current position obtained from a GPS module. The digital camera can record information about one landmark selected by a user from the plurality of the retrieved landmarks in an image. At this time, since it takes a time to retrieve landmark names, the landmark information retrieved once is temporarily stored in a memory as a cache. Validity of the landmark information stored in the cache is determined. When valid, the landmark name of the valid landmark information is retrieved by using the cache of the landmark information. When invalid, new landmark information is retrieved (searched for). In the first embodiment, as one example, a number (Nd) of landmarks to be displayed is 5, and those landmarks are candidate for selecting a landmark name. A maximum number (Nmax) of landmark information to be stored as the cache is 9 as one example.

2. Configuration of Digital Camera

Figure 1:
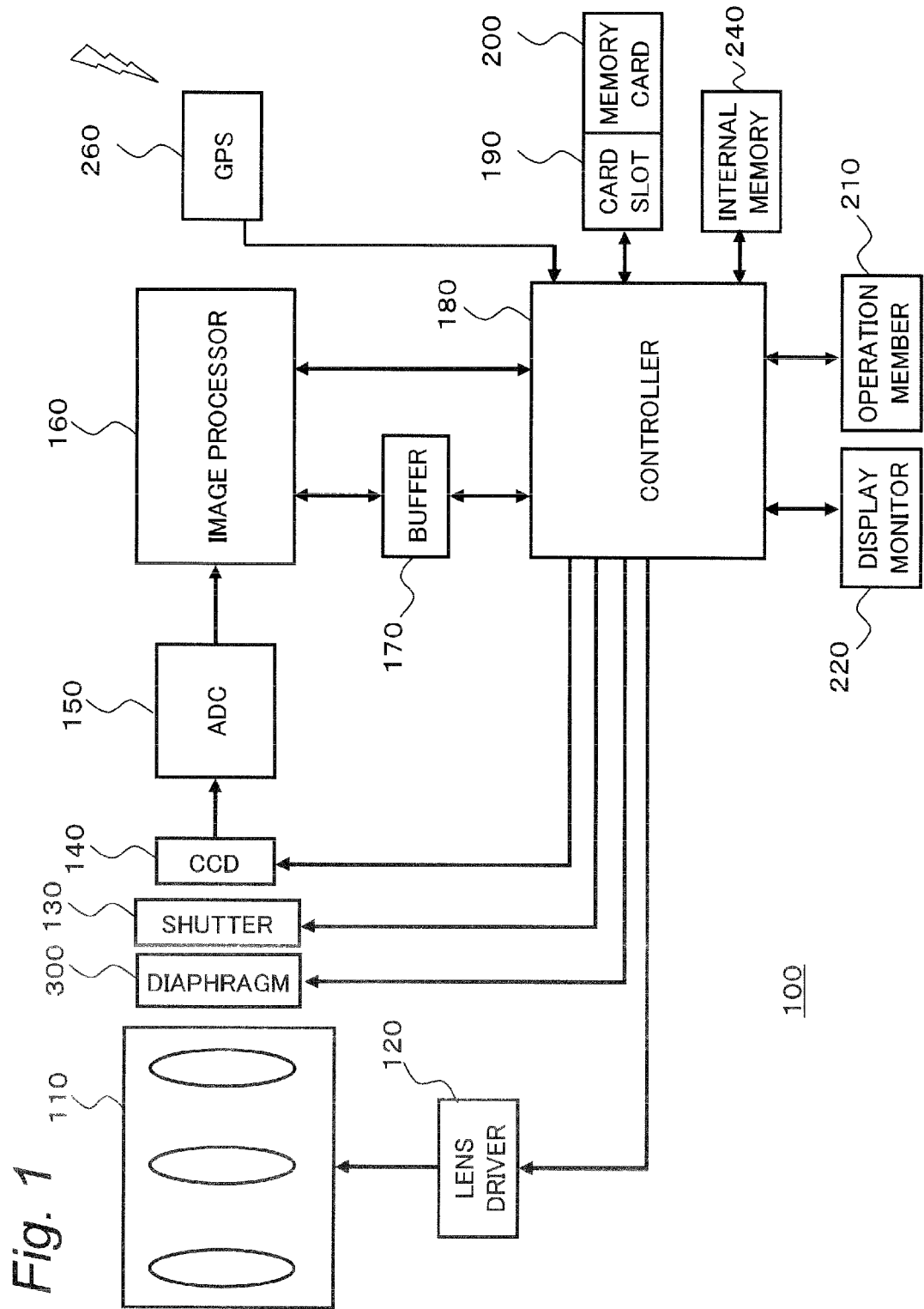
FIG. 1 is a block diagram illustrating a configuration of a digital camera including a landmark search apparatus according to first to third embodiments.

A configuration of a digital camera 100 according to the first embodiment is described with reference to FIG. 1. FIG. 1 is a block diagram illustrating the configuration of the digital camera 100. The digital camera 100 images a subject image formed by an optical system 110 including one or a plurality of lenses, with a CCD image sensor 140. Image data generated by the CCD image sensor 140 is subject to various processes in an image processor 160, and is stored in a memory card 200. A controller 180 identifies landmarks around a current position from the landmark information (database) stored in an internal memory 240 based on information about the current position obtained from a GPS module 260. The configuration of the digital camera 100 is described in detail below.

The optical system 110 includes a zoom lens and a focus lens. The zoom lens is moved along an optical axis to enlarge or reduce the subject image. The focus lens is moved along the optical axis to adjust a focus of the subject image.

A lens driver 120 drives various lenses included in the optical system 110, which is, for example, a zoom motor for driving the zoom lens and a focus motor for driving the focus lens.

A diaphragm 300 adjusts an aperture automatically or according to user's setting to control a quantity of transmitting light.

A shutter 130 is a unit for blocking (light shielding) light incident to the CCD image sensor 140 via the optical system 110.

The CCD image sensor 140 captures a subject image formed by the optical system 110 to generate analog image data. The CCD image sensor 140 performs various operations such as exposure, transmission and electronic shutter.

An A/D converter 150 converts the analog image data generated by the COD image sensor 140 to digital image data.

An image processor 160 executes a predetermined process on the image data that is generated by the CCD image sensor 140 and is converted to digital data, and generates image data to be displayed on a display monitor 220, image data to be output to the outside via an input/output I/F (not shown), and image data to be stored in a memory card 200. For example, the image processor 160 executes various processes such as gamma correction, white balance correction and scratch correction on the image data generated by the CCD image sensor 140. Further, the image processor 160 executes a coding process on the image data generated by the CCD image sensor 140. At this time, for the image data which is a still image, the image processor 160 uses a coding method according to the JPEG standard. For the image data which is a moving image, the image processor 160 uses a coding method according to the MPEG standard. The image processor 160 executes a decoding process on the image data subject to a coding process. The image processor 160 can be realized by a digital signal processor (DSP) or a microcomputer.

The controller 180 is a control unit for controlling an entire operation of the digital camera 100. The controller 180 can execute a process for superimposing OSD (On Screen Display) on the image data. The image data on which OSD is superimposed is displayed on the display monitor 220, and is output to the outside of the digital camera 100. The OSD is used for displaying a menu screen for various settings in the digital camera 100, landmark information, and icons representing currently displayed image data.

A buffer 170 functions as a work memory of the image processor 160 and the controller 180. The buffer 170 can be realized by a DRAM, a ferroelectric memory, or the like.

A card slot 190 can be loaded with the memory card 200 so that it is mechanically and electrically connected to the memory card 200. The memory card 200 includes a storage element of a flash memory or a ferroelectric memory, and can store data such as image files generated by the image processor 160.

An operation member 210 is a generic name of a user interface for receiving user's operations. The operation member 210 includes a cross cursor key, a set button, a shutter button, and a power button for receiving user's operations.

The display monitor 220 can display image data (through image) generated by the CCD image sensor 140 and image data read from the memory card 200. The through image means an image that is not finally recorded in the memory card 200. Further, the display monitor 220 can display a plural pieces of landmark information that are retrieved from the landmark information stored in an internal memory 240 and is determined as being present near a current position. A landmark searching method is described later.

Figure 2:
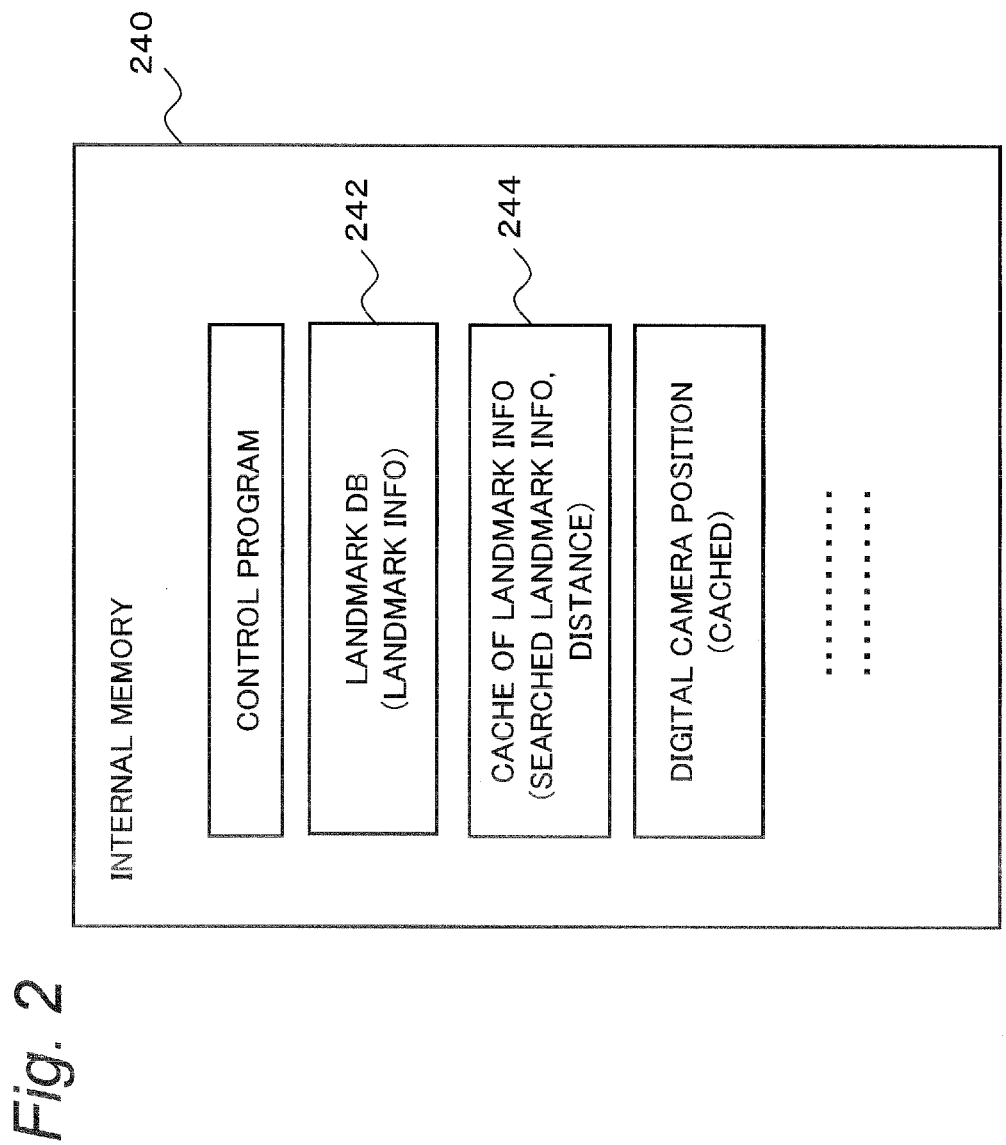
FIG. 2 is a diagram illustrating an example of information to be stored in an internal memory.

The internal memory 240 stores a control program for entirely controlling the digital camera 100, and a landmark database (hereinafter "landmark DB") 242, as shown in FIG. 2. The landmark DB 242 is a database for managing information about positions and names of plural landmarks (hereinafter, "landmark information"). Further, the internal memory 240 stores landmark information (hereinafter, "a cache of the landmark information") 244 that is retrieved from the landmark DB and is cached, and a position of the digital camera 100 at the time of storing the cache. Details of the landmark DB 242 and the cache 244 of the landmark information are described later. The internal memory 240 can be realized by, for example, a nonvolatile storage element such as a flash memory or a ferroelectric memory.

The GPS module 260 detects a position of the digital camera 100 on earth using a global positioning system (GPS). The GPS module 260 receives a signal from a GPS satellite according to an instruction from the controller 180. The signal includes information required for calculating the current position of the digital camera 100 such as time of a timer built in the satellite and orbit information about the satellite. The controller 180 calculates the current position of the digital camera 100 with latitude and longitude based on this signal.

The digital camera 100 is one example of an electronic apparatus and an imaging device. The COD image sensor 140 is one example of an imaging unit. The memory card 200 is one example of a recording medium. The internal memory 240 is one example of first and second storage units. The controller 180 is one example of a determining unit and a retrieving unit. The display monitor 220 is one example of a display unit. The GPS module 260 is one example of a position obtaining unit.

3. Landmark Information

A landmark generally means a building, a symbolic monument representing country and area, architectural structure, or space, which can be a mark on the ground. The landmark also includes characteristic nature, building or phenomena which can be a mark in a wide area. In an electronic map used in an electronic apparatus such as a navigation device, a personal digital assistant and a digital camera, icon representing a landmark and detailed information about the landmark are often displayed on a map screen.

In the first embodiment, the landmark information includes landmark names and position information about the landmarks. The internal memory 240 stores the landmark DB 242 for managing a plurality of landmark information. The controller 180 retrieves a landmark present near a current position from the landmark information (landmark DB 242) stored in the internal memory 240 based on the information about the current information obtained by the GPS module 260, and stores the retrieved landmarks as a cache 244 of the landmark information in the internal memory 240.

FIG. 3 illustrates one example of the landmark DB 242 stored in the internal memory 240. Each of entries in the drawing shows one set of landmark information to be managed in the landmark DB. In the landmark information, identification number (ID), landmark name and position information about the landmark are related to each other. The landmark name can be displayed when the landmark is displayed on the rap and information about the landmark near the current position is displayed on the map. The position information is represented with latitude and longitude of the position of the landmark on earth.

4. Operation of Digital Camera

The digital camera 100 obtains a current position at a predetermined timing, and retrieves landmark information near the digital camera 100 based on the current position with reference to the landmark DB 242 and displays the retrieved landmark information on the display monitor 220. The digital camera 100 relates the information about the landmark selected by the user with imaged image data so as to be capable of recording it in the memory card 200.

4.1 Landmark Retrieving Operation

Figure 4:
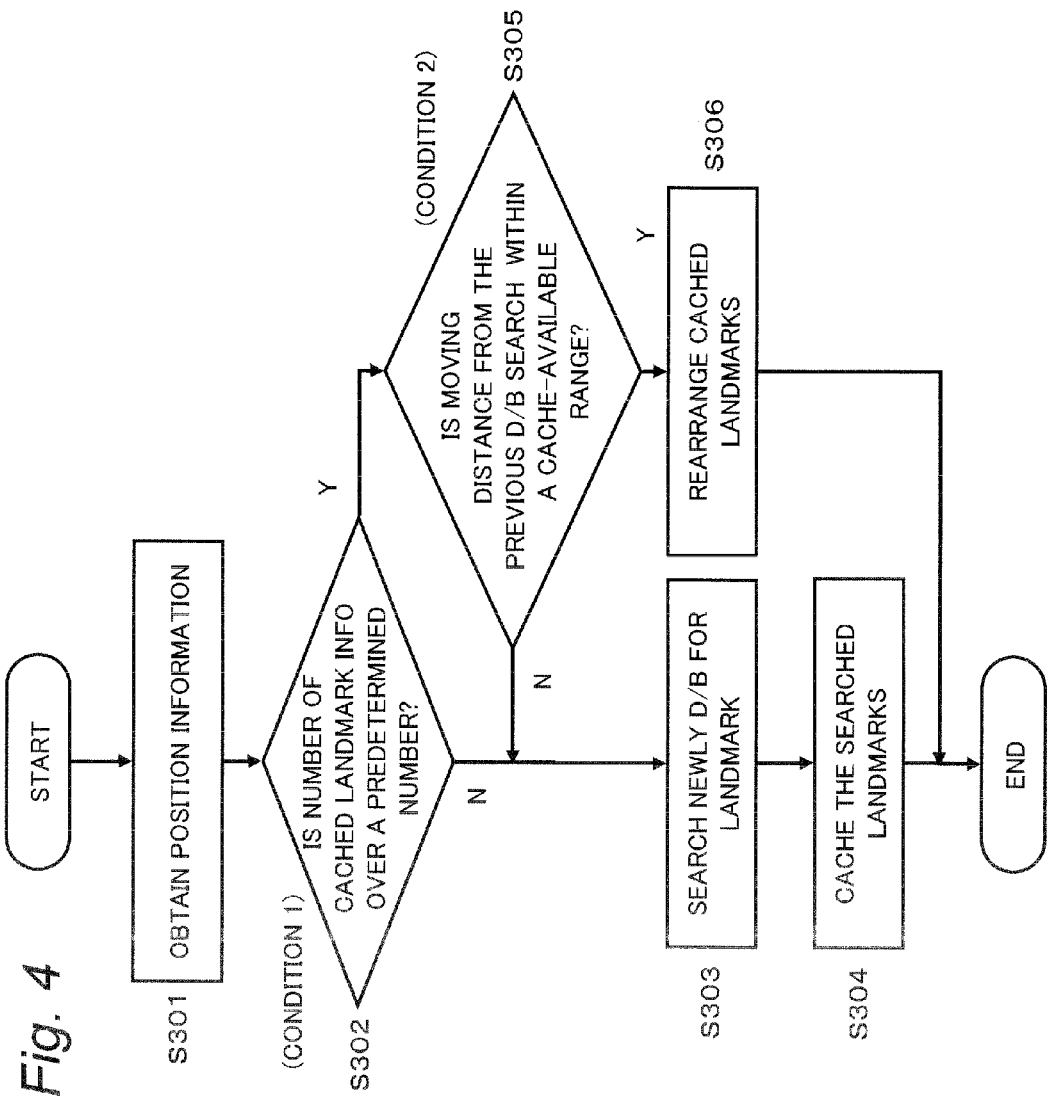
FIG. 4 is a flowchart illustrating an operation for retrieving landmarks according to the first embodiment.

The landmark retrieving operation in the digital camera 100 according to the first embodiment is described below. FIG. 4 is a flowchart illustrating the landmark retrieving (search) operation of the digital camera 100. The controller 180 drives the GPS module at every predetermined time (for example, every 15 minutes) to obtain information about the current position of the digital camera 100. The predetermined time may be a fixed value or may be changed according to an operating state (recording mode, reproducing mode, upon of power-off). The controller 180 calculates the current position of the digital camera 100 in a format of latitude and longitude based on the obtained information (S301). The controller 180 then determines whether the cache 244 of the landmark information stored in the internal memory 240 can be used, namely, the cache 244 is valid (S302 and S305). The availability of the cache, namely, the validity of the cache 244 is determined based on a predetermined condition, and its details are described later.

When it is determined that the cache is not valid (namely, the cache cannot be used) (NO at S302 or S305), the controller 180 refers to the landmark DB 242 to retrieve the landmark information about the landmarks around the digital camera 100 (S303). In the first retrieval of the landmark information, no cache is present in the internal memory 240, and thus determination is made that a cache cannot be used, so that landmark information for a landmark near the digital camera 100 is newly retrieved from the landmark DB 242 (S303). Regarding the retrieval of the landmark information, only a landmark within a predetermined distance from the current position of the digital camera 100 may be retrieved. Alternatively, the retrieval may be performed so that a number of the retrieved landmark information is within a predetermined number.

The controller 180 displays all or part of the retrieved landmarks as neighboring landmark information on the display monitor 220. The retrieved landmarks can be used for recording the image after being related to the image data. The controller 180 calculates distances between the current position and the landmarks for the respective pieces of landmark information retrieved by the retrieval. The controller 180 relates the landmark information with the calculated distances and records them as a cache in the internal memory 240 (S304).

FIG. 5 illustrates one example of the cache 244 of the landmark information stored in the internal memory 240. The cache 244 of the landmark information includes information about the distance between the current position and the landmark as well as data structure of the landmark information shown in FIG. 3. In the cache 244 of the landmark information, the landmark information is rearranged (sorted) in ascending order of the distance between the current position and the landmark. In the first embodiment, a predetermined number (Nd=5 in the first embodiment) of landmarks are displayed on the display monitor 220 beginning from one closest to the current position. The distance between the current position and the Nd-th closest landmark is defined as a display distance (Ld). In the example of FIG. 5, the landmark that is the Nd-th closest to the current position is "A" Park with ID=1, and the distance to the "A" Park is Ld. In the first embodiment, the predetermined number of landmark information (Nmax=9 in the first embodiment) is stored as a cache. The distance from the current position to the landmark being Nmax-th closest is a maximum distance (Lmax). In the example of FIG. 5, the landmark that is the Nmax-th closest to the current position is "B" Tower with ID=2, and the distance to the "B" Tower is Lmax. The landmark information may be cached not in a nonvolatile memory but in a volatile memory.

On the other hand, when the validity of the cache is determined (namely, the cache is available) (YES at S302 and YES at S305), the landmark information in the cache is rearranged (S306). Concretely, the landmark information is rearranged in ascending order based on the distance between the current position and the landmark. The rearranged landmark information is used for display and recording.

4.1.1 Determination of Validity of Cache

The determination of the validity of cache at steps S302 and S305 (determination of the availability of cache) is concretely described.

In the first embodiment, the validity of the cache (the availability of cache) is determined based on the following two conditions.

Condition 1) The number of cached landmark information exceeds a predetermined number for cache availability (S302). The predetermined number is equal to the number Nd for the landmarks to be displayed.

Condition 2) A moving distance from the position of the digital camera 100 at the previous retrieval of the landmark DB 242 (namely, at a moment when the retrieved latest landmark information is stored as a cache in the internal memory 240) is within a cache available distance (S305). The cache available distance is calculated according to (Lmax−Ld)/2.

The condition 1 is a condition used for determining whether a sufficient number of landmark information is cached in the internal memory 240. When the sufficient number of landmark information is not cached, landmark information is retrieved again so that the sufficient number of landmark information can be obtained. The condition 2 is a condition related to the moving distance, for allowing landmark information available for display even after the movement to be included in the landmark information cached before the movement. That is to say, when the condition 2 is satisfied, Nd landmarks that are the closest to the current position after the movement are always included in the NMax landmarks cached before the movement. The cache available distance is determined as such a distance. When the determination is made based on the condition 2, the availability of updating of the cache can be determined, thereby preventing unnecessary accesses to the landmark DB 242.

When determining that both the condition 1 and the condition 2 are satisfied at the time of the determinations (S302 and S305), the controller 180 determines that the cache 244 is available and rearranges the landmark information in the cache 244 without newly retrieving from the landmark DB 242 (S306). The rearranged landmark information is used for display on the display monitor 220 and recording in the memory card 200. On the other hand, when determining that at least one of the condition 1 and the condition 2 is not satisfied, the controller 180 determines that the cache 244 is not available, and the controller 180 searches newly the landmark DB 242 stored in the internal memory 240 to retrieve new landmark information for neighboring landmarks (S303). Since the landmark DB 242 is searched only when the search is necessary, the number of accesses to the landmark DB 242 can be reduced, thereby improving a processing speed.

Figure 6:
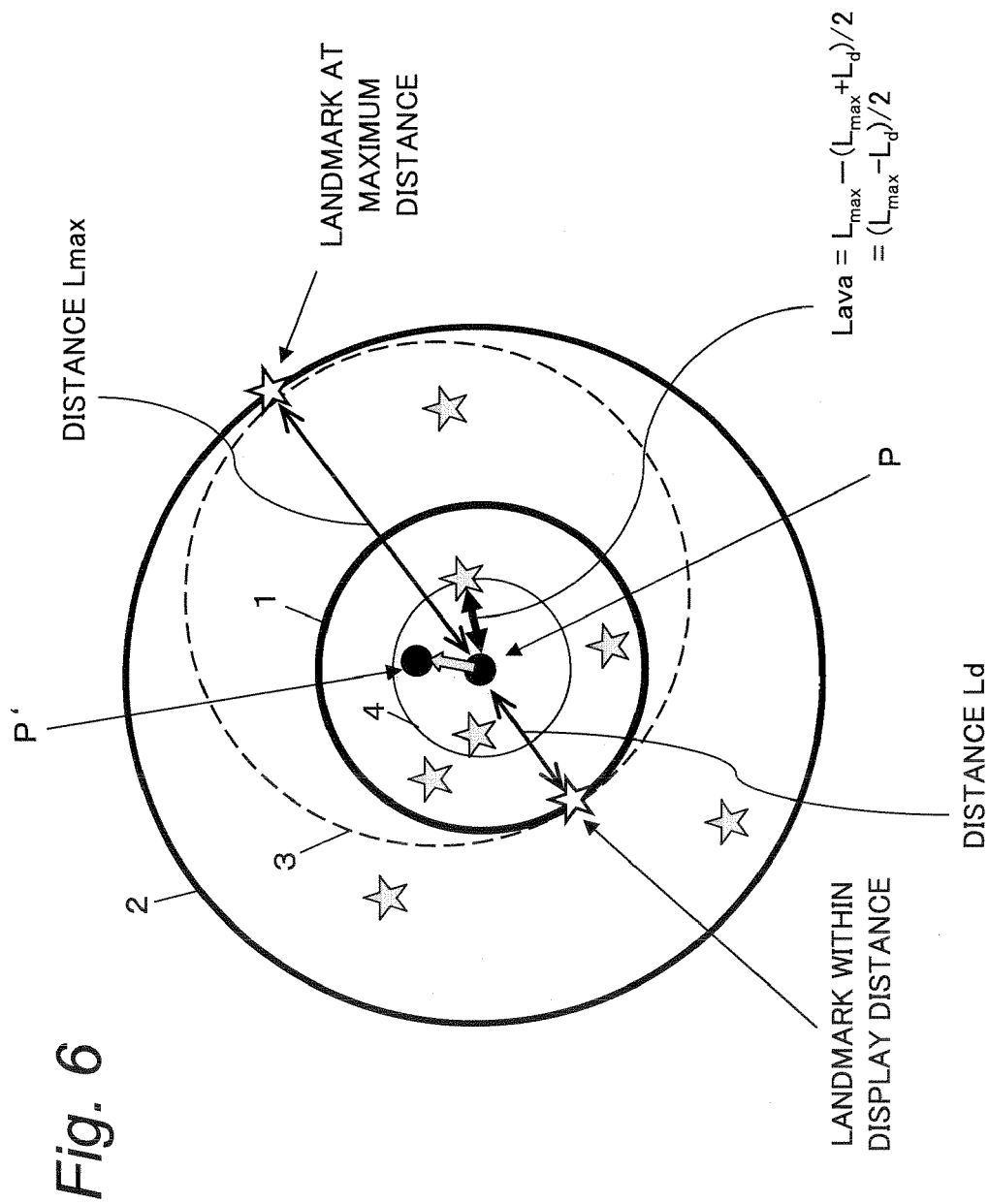
FIG. 6 is a diagram for explaining a cache available condition.

With reference to FIG. 6, the condition 2 is described concretely. A position of the digital camera 100 at the time of the previous searching the landmark PB 242 (namely, the time when the retrieved latest landmark information is cached in the internal memory 240) is determined as a position P. A circle 1 having a center at P and a radius equal to a distance Pd of the landmark which is the Nd-th (Nd: maximum display number) closest to the position. P, and a circle 2 having a center at P and a radius equal to a distance Lmax of the landmark which is the Nmax-th (Nmax: maximum cache number) closest to the position P are defined. A moving distance (cache available distance) is examined, which allows Nd pieces of landmark information in the Nmax pieces of landmark information currently cached to be still included in the cache after the digital camera 100 is moved from the position P to a position P'. In order to satisfy this condition, a range where the digital camera 100 may move (namely, a range in which the position P' can be located after the movement) is a range where a center of a circle 3, which is an inscribed circle of the circle 2 and a circumscribed circle of the circle 1, can move. The circle 3 can be defined as a circle of which diameter is a sum of the radius of the circle 1 and the radius of the circle 2. That is to say, a range of an inside of a circle 4 which has a center at the position P and is defined by the following formula (1) is a moving range where the cache is available. Therefore, the distance ("cache available distance") where the cache is valid and available is equal to a radius Lava of the circle 4, which is obtained by the following formula.

$$\text{Radius Lava} = \text{Radius of Circle 2} - \text{Radius of Circle 3} \quad (1)$$
$$= L\max - (L\max + Ld)/2$$
$$= (L\max - Ld)/2$$

That is to say, in case where the current position of the digital camera 100 is the position P, when the moving distance of the digital camera 100 is within the radius Lava, it is determined that the landmark information cached in the internal memory 240 is valid. On the other hand, when the digital camera 100 moves by a distance exceeding the radius Lava, it is determined that the landmark information cached in the internal memory 240 is invalid, and the landmark DB 242 is newly searched.

The determining operations based on the conditions 1 and 2 in a state that the cache is as shown in FIG. 5 are described concretely. In FIG. 5, Nd=5, Ld=400 m ("A" Park), Nmax=9, and Lmax=1000 m ("B" Tower). It is checked whether the number of landmark information cached in the internal memory 240 exceeds the available number (Nd) (S302). The number of cached landmark information is 9, and thus it exceeds the available number (Nd=5). Therefore, it is checked whether a moving distance from a position at the time of the previous DB search (namely, at the time of the previous cache) to the current position is within the cache available distance (Lava) (S305). As described above, the moving distance (cache available distance) Lava for allowing the cache to be available is 300 m.

$$\text{Lava} = 1000 - \{(1000+400)/2\} = 300 \text{ (m)}$$

Therefore, when the moving distance from the position at the time of the previous search of the landmark DB 242 to the current position is 300 m or less, the cache 244 can be used. When the cache 244 can be used, distances between the cached landmark information and the current position are recalculated, the pieces of landmark information are rearranged in near order, and then the cache 244 is updated. As a result, in the case of the above condition, a process for re-retrieving from the landmark DB 242 including many pieces of landmark information is not necessary, and thus the landmark information can be retrieved entirely at high speed.

In the first embodiment, the maximum display number Nd and the maximum cache number Nmax are determined as 5 and 9, respectively, but these values are examples. They may be other values. It is preferable that the maximum display number Nd is smaller than the maximum cache number Nmax. In this manner, by caching extra pieces of landmark information that are not used for display, frequency of access to the landmark DB 242 can be reduced, thereby heightening the speed of the landmark information retrieving process.

As shown in FIG. 5, the distance between the landmark and the current position is cached. But as long as the distance Lava is stored, the distance between the landmark and the current position do not have to be necessarily cached.

5. Conclusion

According to the first embodiment, the validity of the landmark information stored (cached) in the internal memory 240 is determined, and when the landmark information is valid, landmark information is not newly retrieved. Only when invalid, landmark Information can be retrieved again. With such a configuration, when cached landmark information is invalid, landmark information is always retrieved again. This allows valid information to be always cached and thus the landmark can be accurately retrieved. Further, only when cached landmark information is invalid, landmark information is retrieved again, thereby reducing the number of retrieving times. In this manner, the landmark search apparatus that enables the accurate landmark retrieval process at high speed using a small-capacity memory can be realized.

Second Embodiment

Figure 7:
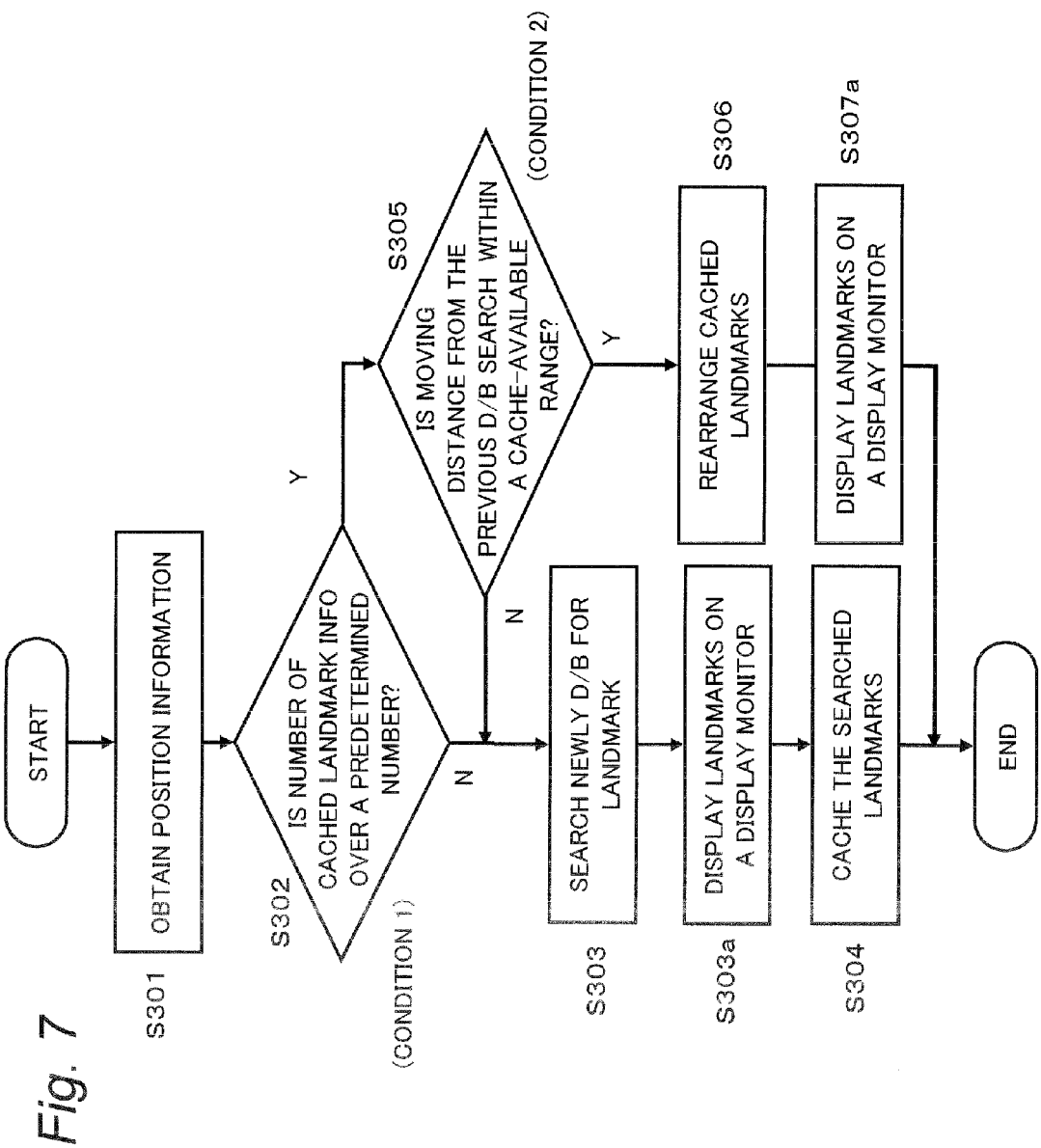
FIG. 7 is a flowchart illustrating a landmark retrieving process according to the second embodiment.

In the first embodiment, necessity of the re-retrieval of the landmark information is determined based on the determination of the validity of the cache. A second embodiment describes an example where the display of landmark information on the display monitor 220 is controlled based on the determination of the validity of a cache. FIG. 7 is a flowchart of the digital camera 100 according to the second embodiment.

The controller 180 obtains position information from the GPS module 260 at every predetermined time (S301). Thereafter, as described in the first embodiment, the validity of the cache is determined based on the conditions 1 and 2 (S302 and S305).

Figure 8:
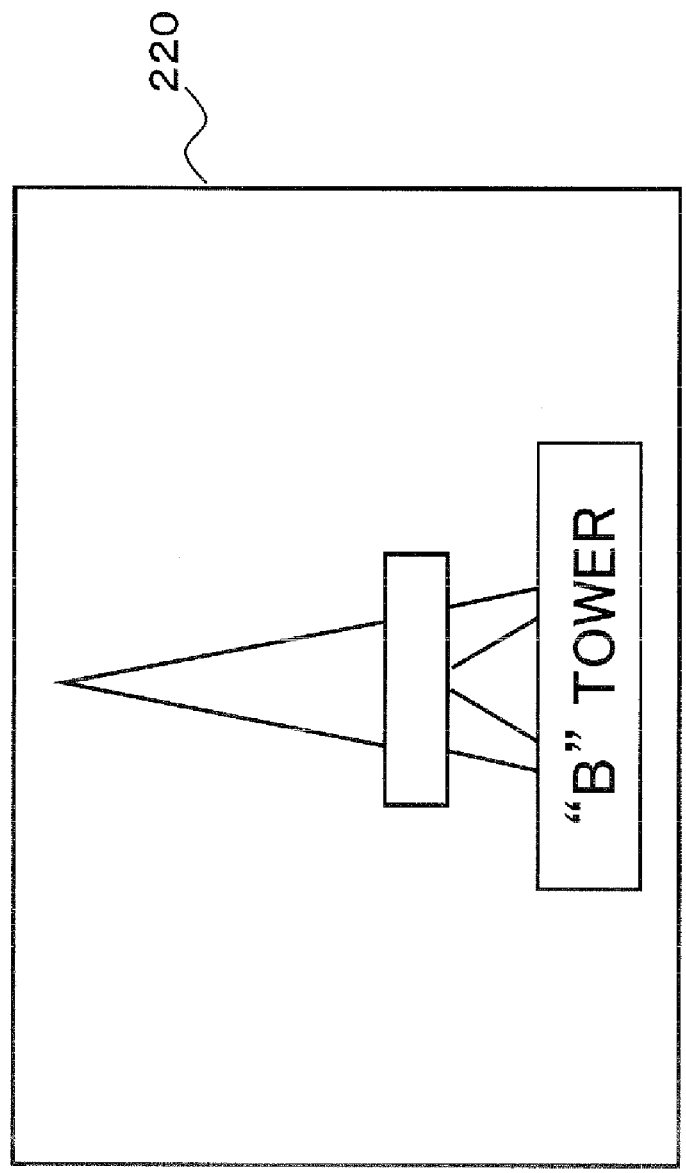
FIG. 8 is a diagram illustrating an exemplary display of an image on which landmark information is superimposed.

When it is determined that the cache is valid (namely, available) (YES at S302 and S305), the controller 180 rearranges cached landmark information (S306). The rearranging is performed in ascending order of the distance between the landmark and the current position. The controller 180 referring to the cache specifies the landmark closest to the current position, and as shown in FIG. 8, superimposes the landmark information (for example, a name) on an image so as to display it on the display monitor 220 (S307a).

On the other hand, when it is determined that the cache is invalid (namely, unavailable) (NO at S302 or S305), the controller 180 newly searches the landmark DB 242 for a landmark (S303). The controller 180 specifies a landmark closest to the current position based on the search result, and superimposes the landmark information (for example, a name) on the image so as to display it on the display monitor 220 (S303a). Thereafter, the controller 180 caches the searched result in the internal memory 240 (S304).

In this manner, the landmark information is superimposed on the image to be displayed on the display monitor 220 of the digital camera 100, and the landmark information is suitably updated according to the position of the digital camera 100.

Figure 9:
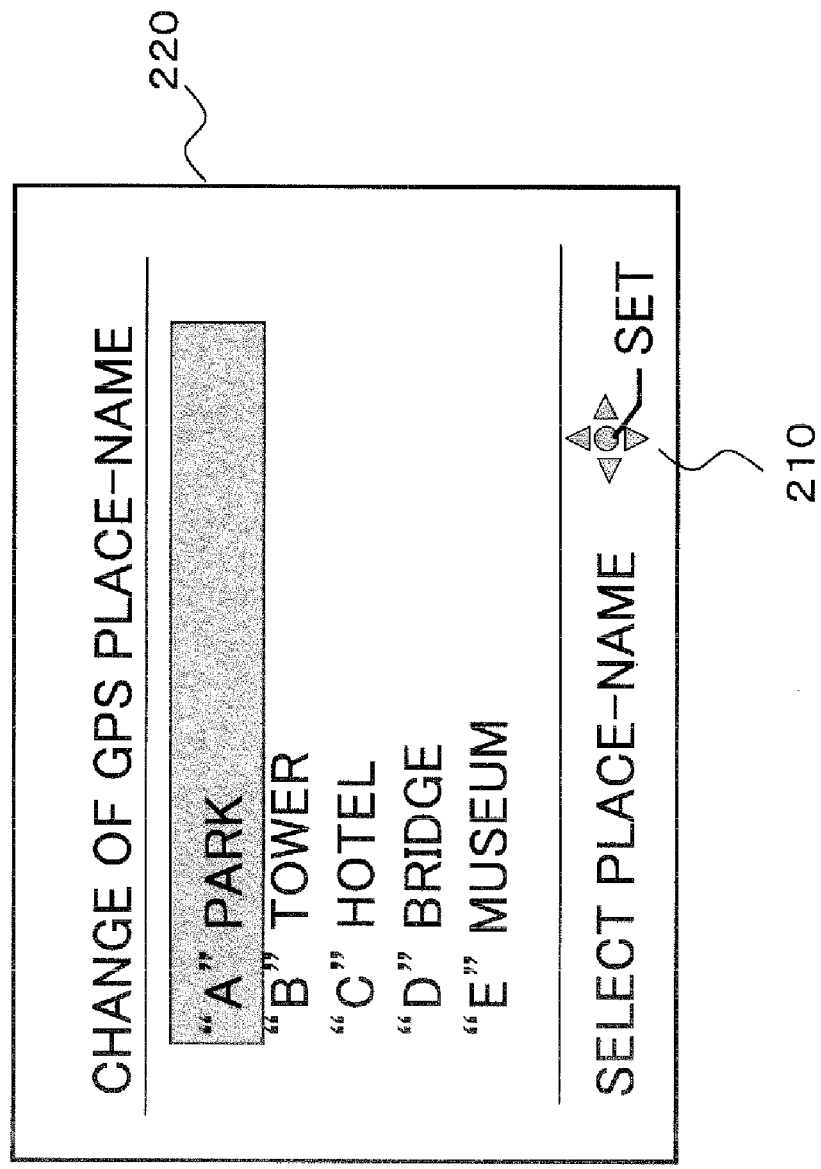
FIG. 9 is a diagram illustrating one example of a selection screen of landmarks.

The digital camera 100 according to the second embodiment has a function for changing a landmark to be displayed on the display monitor 220 by a user. FIG. 9 is a diagram illustrating a screen for selecting a landmark to be displayed on the display monitor 220 of the digital camera 100. Five (Nd) landmarks closer to the current position in nine (Nmax) landmarks cached in the internal memory 240 are displayed as selection candidates. The user operates the cross cursor key or the set button to select one landmark. The information about the landmark selected by the user is displayed on the display monitor 220 as shown in FIG. 8. On the selection screen, all the cached landmarks may be presented to the user as the selection candidates. Further, the information about the landmark selected by the user may be related to an image selected by the user and be recorded in the memory card 200, as described later.

In the second embodiment, the display on the display monitor 220 is switched based on the result of determining the validity of the cache between displaying of some of all pieces of already cached landmark information without re-search of landmark information and displaying of newly searched landmark information.

Third Embodiment

The first embodiment describes the example where the landmarks are retrieved at a predetermined timing. In a third embodiment, an example where landmarks are retrieved when the imaging process is started is described. The configuration in the third embodiment is particularly useful for a case where the current position is obtained continuously (that is, at very short time interval). This configuration enables more accurate landmark search based on the position information at the point where the imaging process is executed.

Figure 10:
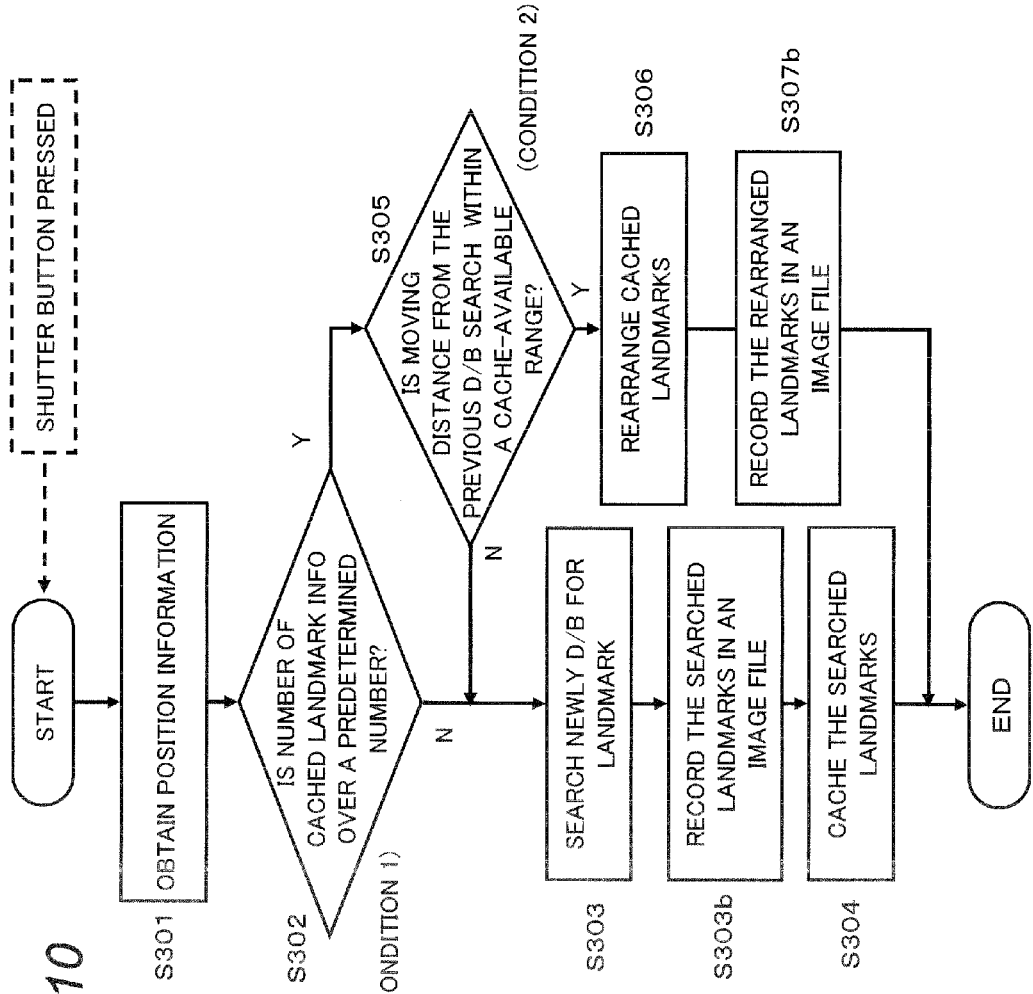
FIG. 10 is a flowchart illustrating a landmark retrieving process according to the third embodiment.

With reference to FIG. 10, the landmark retrieving process in the digital camera 100 according to the third embodiment is described. FIG. 10 illustrates a flow of the process when the shutter button is pressed down to start the imaging process. The digital camera 100 can relate information about landmark with the captured image data and record the image data in the memory card 200. When the shutter button is pressed down, the CCD image sensor 140 generates image data, and the image processor 160 executes a predetermined process on the image data. The process in FIG. 10 is executed in parallel with the processes in the CCD image sensor 140 and the image processor 160.

In FIG. 10, when the shutter button is pressed down, the controller 180 obtains position information from the GPS module 260 (S301). Then, the availability of the cache is determined based on the conditions 1 and 2, as described in the first embodiment (S302 and S305).

When it is determined that the cache is valid (that is, the cache is available) (YES at S302 and S305), the controller 180 rearranges the cached landmark information. The rearranging is carried out in ascending order of the distance between the landmark and the current position. The controller 180 relates the rearranged result of the landmark information with the image data to generate an image file, and records the image file in the memory card 200 (S307b). The relating between the landmark information and the image data can be realized by recording the landmark information as additional information about the image data according to, for example, Exif (Exchangeable Image File Format) standard. As the landmark information to be added to the image data, only information about the landmark closest to the current position may be recorded or all pieces of the rearranged landmark information may be recorded. When all pieces of the rearranged landmark information are recorded, the user can select landmarks desired to be again displayed using that information at the time of reproduction.

On the other hand, when it is determined that the cache is invalid (that is, the cache is not available) (NO at S302 or S305), the controller 180 newly searches the landmark DB for landmark (S303). Thereafter, the controller 180 relates the searched results with the image data to generate an image file so as to record the image file in the memory card 200 (S303b). When a new DB search process takes too much time to influence the image file recording process, the image file may be once recorded without relating the landmark information. After the recording of the landmark information is completed, the searched results may be added to the recorded image file. After the recording of the image file is completed, the searched results are cached in the internal memory 240 (S304). As the landmark information to be added to image data, only information about the landmark closest to the current position may be recorded, or all pieces of the cached landmark information may be recorded. When all pieces of the cached landmark information are recorded, the user can select landmarks desired to be again displayed.

With the above configuration, the cache of the landmark information is updated at every time an image is taken, and thus it is possible to search landmarks more accurately based on the position information of a position where an image is taken. Further, the recording is switched, based on the result of determining the validity of the cache, between recording of the already cached landmark information with the image data without researching landmark information, and recording of researched landmark information with the image data.

Other Embodiments

The specific embodiments are described above, the embodiments are not limited to the above. Other embodiments are descried below.

In the above embodiments, the GPS module 260 outputs information for calculating the current position of the digital camera 100, and the controller 180 calculates the current position of the digital camera 100 as latitude and longitude based on the signal. Not limited to this, the GPS module 260 may calculate and output latitude and longitude.

The above embodiments illustrate the CCD image sensor 140 as the imaging unit, but the imaging unit is not limited to this. For example, the imaging unit may be a CMOS image sensor or an NMOS image sensor.

In the above embodiments, the image processor 160 and the controller 180 may be constituted by one semiconductor chip or separate semiconductor chips. The aforementioned assignment of functions of the processing in the image processor 160 and the controller 180 is one example. The process in the image processor 160 may be executed by the controller 180, while the process of the controller 180 may be executed by the image processor 160.

INDUSTRIAL APPLICABILITY

The embodiments can retrieve landmarks accurately at high speed with a small-capacity memory, and thus the concept of the above embodiments can be applied to an electronic apparatus such as a digital still camera, a digital video camera, a car navigation system, and personal digital assistance that have the function for retrieving landmarks around an obtained current position.

What is claimed is:

1. A landmark search apparatus for retrieving landmarks around an object, comprising:
    a position obtaining unit configured to obtain a current position of the object;
    a first storage unit configured to store landmark information including a name of a landmark and position information of the landmark related to the name;
    an retrieving unit configured to configured to retrieve the landmark information from the first storage unit based on the obtained current position;
    a second storage unit configured to store the retrieved landmark information as retrieved landmark information; and
    a determining unit configured to determine whether the retrieved landmark information is valid based on: i) the current position of the object; ii) a previous position of the object at a time of storing the retrieved landmark information in the second storage unit; iii) a first distance between the previous position and a farthest landmark from the previous position in landmarks indicated by the landmark information stored in the second storage unit; and iv) a second distance between the previous position and a landmark which is N-th farthest from the previous position in the landmarks indicated by the landmark information stored in the second storage unit, N being a predetermined number,
    wherein the determining unit determines whether a moving distance of the object from the previous position to the current position is more than a half of the first distance minus the second distance to determine whether the retrieved landmark information is valid.

2. The landmark search apparatus according to claim 1, wherein the retrieving unit controls, based on the determined result of the determining unit, whether to retrieve the landmark information again from the first storage unit based on the current position.

3. The landmark search apparatus according to claim 2, wherein
    when the determining unit determines that the retrieved landmark information stored in the second storage unit is invalid, the retrieving unit retrieves again the landmark information from the first storage unit based on the current position, and the second storage unit stores the landmark information retrieved again as new retrieved landmark information, and
    when the determining unit determines that the retrieved landmark information stored in the second storage unit is valid, the retrieving unit does not retrieve the landmark information from the first storage unit based on the current position.

4. The landmark search apparatus according to claim 1, further comprising a display unit configured to display at least a part of the retrieved landmark information,
    wherein the display unit controls, based on the determined result of the determining unit, whether to display the at least part of the retrieved landmark information stored in the second storage unit.

5. The landmark search apparatus according to claim 1, further comprising a recording unit configured to record at least a part of the retrieved landmark information stored in the second storage unit in a predetermined recording medium,
    wherein the recording unit controls, based on the determined result of the determining unit, whether to record the at least part of the retrieved landmark information stored in the second storage unit in the recording medium.

6. The landmark search apparatus according to claim 1, wherein the determining unit determines whether the retrieved landmark information is valid within a predetermined time interval.

7. An electronic apparatus comprising:
    the landmark search apparatus according to claim 1; and
    a display unit configured to display at least a part of the retrieved landmark information.

8. An imaging apparatus comprising:
    the landmark search apparatus according to claim 1;
    an imaging unit configured to capture a subject image formed by an optical system to generate image data; and
    a recording unit configured to relate the image data with at least part of the retrieved landmark information and to record them in a recording medium.

9. The imaging apparatus according to claim 8, wherein the recording unit controls whether to relate the image data with the at least part of the retrieved landmark information and to record them in a recording medium, based on the determined result of the determining unit of the landmark search apparatus.

10. The imaging apparatus according to claim 8, further comprising an instruction receiving unit configured to receive an instruction for recording the image data generated by the imaging unit in the recording medium,
    wherein when the instruction receiving unit receives the instruction for recording the image data generated by the imaging unit in the recording medium, the determining unit determines whether the retrieved landmark information is valid.

11. The imaging apparatus according to claim 8, wherein the determining unit determines whether the retrieved landmark information is valid within a predetermined time interval.

12. A landmark search method for searching for landmarks around an object, the method comprising:
   obtaining a current position of the object;
   storing a name of the landmark and position information of the landmark, as landmark information, in a first storage unit, with the name of the landmark related with the position information of the landmark;
   retrieving the landmark information from the first storage unit based on the obtained current position;
   storing the retrieved landmark information, as retrieved landmark information, in a second storage unit; and
   determining whether the retrieved landmark information is valid based on: i) the current position of the object; ii) a previous position of the object at a time of storing the retrieved landmark information in the second storage unit; iii) a first distance between the previous position and a farthest landmark from the previous position in landmarks indicated by the landmark information stored in the second storage unit; and iv) a second distance between the previous position and a landmark which is N-th farthest from the previous position in the landmarks indicated by the landmark information stored in the second storage unit, N being a predetermined number,
   wherein the determining determines whether a moving distance of the object from the previous position to the current position is more than a half of the first distance minus the second distance to determine whether the retrieved landmark information is valid.

13. The landmark search method according to claim 12, wherein the retrieving the landmark information controls, based on a determined result at the determining, whether to retrieve again the landmark information from the first storage unit based on the current position and to store the landmark information retrieved again in the second storage unit.

14. The landmark search method according to claim 12, further comprising:
   displaying at least a part of the retrieved landmark information,
   wherein the displaying controls, based on the determined result at the determining, whether to display the at least part of the retrieved landmark information stored in the second storage unit.

15. The landmark search method according to claim 12, further comprising:
   recording at least a part of the retrieved landmark information stored in the second storage unit in a predetermined recording medium,
   wherein the recording step controls, based on the determined result of the determining, whether to record the at least part of the retrieved landmark information stored in the second storage unit in the recording medium.

16. The landmark search method according to claim 12, wherein the determining determines whether the retrieved landmark information is valid within a predetermined time interval.

17. The landmark search apparatus according to claim 1, wherein N pieces of landmark information which are nearest to the current position and stored in the second storage unit are displayed as a result of retrieving.

18. The landmark search method according to claim 12, wherein N pieces of landmark information which are nearest to the current position and stored in the second storage unit are displayed as a result of searching.

* * * * *

UNITED STATES PATENT AND TRADEMARK OFFICE
CERTIFICATE OF CORRECTION

PATENT NO. : 8,356,049 B2
APPLICATION NO. : 13/033762
DATED : January 15, 2013
INVENTOR(S) : Kyosuke Osuka and Takehiro Hattori It is certified that error appears in the above-identified patent and that said Letters Patent is hereby corrected as shown below:

In Column 11, Lines 47-49, related to Claims,

"an retrieving unit configured to configured to retrieve the landmark information from the first storage unit based on the obtained current position;..." should read --an retrieving unit configured to retrieve the landmark information from the first storage unit based on the obtained current position;...--

Signed and Sealed this
Thirtieth Day of April, 2013

Teresa Stanek Rea
*Acting Director of the United States Patent and Trademark Office*